US012779877B2

(12) United States Patent
Land et al.

(10) Patent No.: US 12,779,877 B2
(45) Date of Patent: Nov. 3, 2026

(54) PRINTER APPARATUS AND METHOD FOR PRINTING PAGES SPACED AT LESS THAN THE PRINTHEAD WIDTH

(71) Applicant: Neuralog, LP, Stafford, TX (US)

(72) Inventors: Kenneth Price Land, Stafford, TX (US); Robert H. Oujesky, Stafford, TX (US); Sherry Anne Land, Stafford, TX (US)

(73) Assignee: Neuralog, LP, Stafford, TX (US)

( * ) Notice: Subject to any disclaimer, the term of this patent is extended or adjusted under 35 U.S.C. 154(b) by 0 days.

(21) Appl. No.: 19/076,985

(22) Filed: Mar. 11, 2025

(65) Prior Publication Data

US 2025/0206036 A1 Jun. 26, 2025

Related U.S. Application Data

(62) Division of application No. 17/900,118, filed on Aug. 31, 2022, now Pat. No. 12,263,692.

(60) Provisional application No. 63/240,463, filed on Sep. 3, 2021.

(51) Int. Cl.

| | |
|---|---|
| ***B41J 3/407*** | (2006.01) |
| ***B41J 2/045*** | (2006.01) |
| ***G06K 15/00*** | (2006.01) |
| ***G06K 15/02*** | (2006.01) |
| ***G06K 15/10*** | (2006.01) |
| ***G06K 15/16*** | (2006.01) |

(52) U.S. Cl.

CPC ......... *B41J 3/4075* (2013.01); *B41J 2/04508* (2013.01); *B41J 2/04586* (2013.01); *G06K 15/022* (2013.01); *G06K 15/024* (2013.01); *G06K 15/102* (2013.01); *G06K 15/16* (2013.01); *G06K 15/1809* (2013.01); *G06K 15/4065* (2013.01)

(58) Field of Classification Search

CPC .. B41J 3/4075; B41J 2/04508; B41J 2/04586; B41J 11/008; B41J 11/0095; G06K 15/022; G06K 15/024; G06K 15/102; G06K 15/16; G06K 15/1809; G06K 15/4065

See application file for complete search history.

(56) References Cited

U.S. PATENT DOCUMENTS

| | | | | |
|---|---|---|---|---|
| 9,895,912 | B1 * | 2/2018 | Izawa ...................... | B41J 11/46 |
| 2020/0207565 | A1 * | 7/2020 | Koyama .................. | B65H 7/06 |

* cited by examiner

*Primary Examiner* — Geoffrey S Mruk

(74) *Attorney, Agent, or Firm* — D'Ambrosio & Menon, PLLC; Usha Menon

(57) ABSTRACT

A printer and a method for printing of pages on a continuous media, such as labels, with any desired or practical spacing using fixed head printheads that have spacing limitations for printing pages on the continuous media. The printer can be configured to detect a top of form mark on the continuous media as it is moved through a media path in the printer and initiating printing of an image on an adjacent page or label at the position indicated by the top of form mark.

5 Claims, 3 Drawing Sheets

PRINTER APPARATUS AND METHOD FOR PRINTING PAGES SPACED AT LESS THAN THE PRINTHEAD WIDTH

CROSS-REFERENCE TO RELATED APPLICATION

This application is a divisional of U.S. Ser. No. 17/900,118 filed on Aug. 31, 2022, now U.S. Pat. No. 12,263,692 issued on Apr. 1, 2025, which claimed priority to U.S. Provisional Patent Application No. 63/240,463 filed on Sep. 3, 2021, the entire disclosures of which are part of the disclosure of the present application and are hereby incorporated by reference in their entirety.

FIELD OF THE INVENTION

The present invention relates generally to a printer apparatus and method for handling spacing limitations during a printing process. In particular, the present invention relates to an apparatus and method for handling and overcoming space limitation settings for fixed head printers during the printing of batches of single pages, such as label pages, on any type of continuous media.

BACKGROUND OF THE INVENTION

Conventional print technologies/assemblies have spacing limitations during the printing of images, or pages, on continuous print media due to the physical structure of the printhead and its orientation relative to the print media. In such print technologies/assemblies the printhead has a plurality of overlapping print nozzles through which printing ink may be applied to a continuous print media processed through the printer in a direction transverse to the length of the orientation of the printhead. The overlapping print nozzles enable the printer to apply sufficient ink to the print media to produce a detailed image on the print media when the print media is processed at a relatively high rate through the printer. The printhead with overlapping print nozzles has a width defined by the overlapping nozzles. The width of the printhead imposes a printing space limitation between each page when printing consecutive image pages on a continuous print media processed through the printer in a direction parallel to the width of the printhead. For instance, the HP FI-1000™ printhead imposes a space limitation of 10 mm or more between each page to print image pages on continuous media due to the printhead width relative to the direction of paper movement through the printer. This is problematic because industry standards of label printing dictate a smaller space between pages than 10 mm to prevent waste and allow controlled media handling. Therefore, there is a need for a process and an apparatus for printing a continuous media processed through a printer having a printhead of a defined width relative to the direction the continuous media is moved through the printer where contiguous images may be printed on the continuous media at a distance less than the width of the printhead.

SUMMARY OF THE INVENTION

In one embodiment, a printer for printing on a continuous media having a plurality of pages that are positioned sequentially on the continuous media, where each page has a top and a bottom where the continuous media has a top of form mark for each page indicating the position of the top of such page on the continuous media is provided. The printer comprises an actuator, a printhead, a sensor, and a controller. The actuator is structured and arranged to control the movement of the continuous media in a media path through the printer. The printhead is structured and arranged to print on the continuous media as the continuous media is moved in the media path by applying ink to the continuous media. The sensor is structured and arranged to sense the top of form mark of a page on the continuous media as the continuous media is moved in the media path. The controller is signally coupled to the sensor and signally coupled to the printhead. The controller is structured and arranged to a) receive a digital image from a digital image source; b) receive a top of page mark from the sensor; c) provide the digital image to the printhead for printing on the continuous media; d) provide a signal to the printhead to direct the printhead to print the digital image on a page based on receipt of a top of form mark signal from the sensor indicating the top of said page; c) determine an amount of the digital image remaining to be printed on the page upon receiving a top of form mark signal from the sensor indicating the top of a page on the continuous media that is adjacent to the page on which the digital image is being printed; f) determine the position on the page on which the digital image is being printed to stop printing on said page based on the determination of the amount of the digital image remaining to be printed on the page; and g) provide a signal to the printhead to direct the printhead to stop printing the digital image on a page based on the determination of when to stop printing on the page In another aspect, the present invention is a process comprising providing a digital image to a printer; feeding a continuous media through a printer along a media path wherein the continuous media is comprised of a plurality of pages that are positioned sequentially on the media, wherein the continuous media has a top of form mark for each page that indicates the position of the top of such page on the continuous media; printing the digital image onto the continuous media on a first page of the plurality of pages of the continuous media by applying ink onto the first page through a printhead of the printer located along the media path; while printing the digital image onto the first page, detecting the top of form mark corresponding to a second page of the plurality of pages of the continuous media wherein the second page is adjacent to the first page on the continuous media; stopping application of ink to the continuous media after printing the digital image onto the first page to introduce a space between printing on the first page and printing on the second page wherein the position on the continuous media at which application of ink to the continuous media is to be stopped is based on detection of the top of form mark of the second page; and printing the digital image onto the continuous media on the second page of the plurality of pages of the continuous media by applying ink through the printhead onto the second page, wherein the position on the continuous media for initiation of printing the digital image on the second page is based on the top of form mark of the second page and wherein the width of the space produced by stopping application of the ink onto the continuous media after printing the digital image on the first page and initiating printing the digital image onto the continuous media on the second page, as measured in the direction of the movement of the continuous media in the media path, is smaller than the width of the printhead where the width of the printhead is measured in the direction of the movement of the continuous media in the media path.

In a further aspect, the present invention is a printer for printing on a continuous media comprised of a plurality of pages that are positioned sequentially on the continuous media, each page having a top and a bottom where the continuous media has a top of form mark for each page indicating the position of the top of such page on the continuous media. The printer comprises an actuator, a printhead, a sensor, and a controller. The actuator is structured and arranged to control the movement of the continuous media in a first direction and in a second direction in a media path through the printer, where the first direction is opposite the second direction. The printhead is structured and arranged to print on the continuous media as the continuous media is moved in the media path by applying ink to the continuous media. The sensor is structured and arranged to sense the top of form mark of a page on the continuous media as the continuous media is moved in the media path. The controller is signally coupled to the sensor, signally coupled to the actuator, and signally coupled to the printhead. The controller is structured and arranged to a) receive a digital image from a digital image source; b) receive a page top of form mark signal from the sensor; c) provide the digital image to the printhead for printing on the continuous media; d) provide a signal to the printhead directing the printhead to print the digital image on a page of the continuous media starting at a position on the page indicated by the page top of form mark; e) provide a signal to the actuator to move the continuous media in the first direction upon providing a signal to the printhead directing the printhead to print the digital image on a page of the continuous media starting at a position indicated by the page top of form mark; f) provide a signal to the actuator to move the continuous media in the second direction upon completing printing the image on the page; g) provide a signal to the actuator to stop moving the continuous media in the second direction upon the continuous media being positioned at a position indicated by a page top of form mark of an unprinted page adjacent to the page on which the image has been printed; h) provide a signal to the printhead directing the printhead to print the digital image on the adjacent page starting at a position on the adjacent page indicated by the page top of form mark; i) provide a signal to the actuator to move the continuous media in the first direction upon providing a signal to the printhead to direct the printhead to start printing the digital image on the adjacent page.

In a still further aspect the present invention is directed to a process comprising the steps of providing a continuous media comprised of a plurality of pages that are positioned sequentially on the continuous media, each page having a top and a bottom where the continuous media has a top of form mark for each page indicating the position of the top of such page on the continuous media; providing a digital image to the printer; feeding the continuous media in a first direction along a media path through a printer, the printer having a printhead that has a width, wherein the width of the printhead is measured in a direction parallel to the first direction; printing an image on a first page of the continuous media as it is fed through the printer along the media path in the first direction; detecting a top of form mark for a second page on the continuous media, the second page being located adjacent the first page on the continuous media in a second direction where the second direction is opposite the first direction and where the distance between the bottom of the first page and the top of the second page on the continuous media is less than the width of the printhead; after printing the image on the first page, feeding the continuous media through the printer along the media path in the second direction to position the continuous media within the printer at the top of the second page as indicated by the detected top of form mark for the second page; and printing the image on the second page while feeding the continuous media through the printer along the media path in the first direction.

DETAILED DESCRIPTION OF THE INVENTION

The printer and process of the present invention provide a means and a process for printing an image on sequential pages or labels of a continuous media in a printer having a printhead of a defined width as measured relative to the direction of movement of the continuous media through the printer where the image may be printed sequentially on the pages or labels of the continuous media separated by a space less than the width of the printhead. The term printer, as used herein, includes printer assemblies, sub-assemblies and other components that can be used to print media.

In one aspect, the printer and process provide a means and a process for detecting a top of form mark of an unprinted page on the continuous media that is adjacent to a page of the continuous media on which the printer is printing an image as the continuous media is moved through a media path in the printer; determining the media distance required to print the remaining portion of the image on the page or label on which the printer is printing the image based on the detected top of form mark and the image; directing at least a portion of the printhead to stop applying ink to the continuous media at the determined media distance to insert a space on the continuous label media after printing the page; and initiating printing of the image on the adjacent page or label at the position indicated by the top of form mark of the adjacent page or label.

In another embodiment, the printer apparatus (or "printer") and process, as disclosed herein, provide a means and a process for printing an image on sequential pages of the continuous media; detecting a top of form mark of an unprinted page on the continuous media that is adjacent to a page of the continuous media on which the printer is printing an image as the continuous media is moved in a first direction through a media path in the printer; after printing the image on that page of the continuous media, moving the continuous media in a second direction that is opposite the first direction to a position the printhead of the printer at a position corresponding to the top of the adjacent unprinted page as indicated by the detected top of form mark of the unprinted page; and printing the image on the adjacent unprinted page while moving the continuous media in the first direction. The printer and method of the present invention allow the printing of pages with industry standard spacing or with any desired or practical spacing when using printers that have spacing limitations for printing pages on continuous media. For instance, the embodiments of the present invention can facilitate the printing of continuous pages with gaps (space between pages) that are smaller than a printhead spacing limitation. In an embodiment, the pages are labels and the continuous media is comprised of such labels mounted on a continuous backing.

Figure 1:
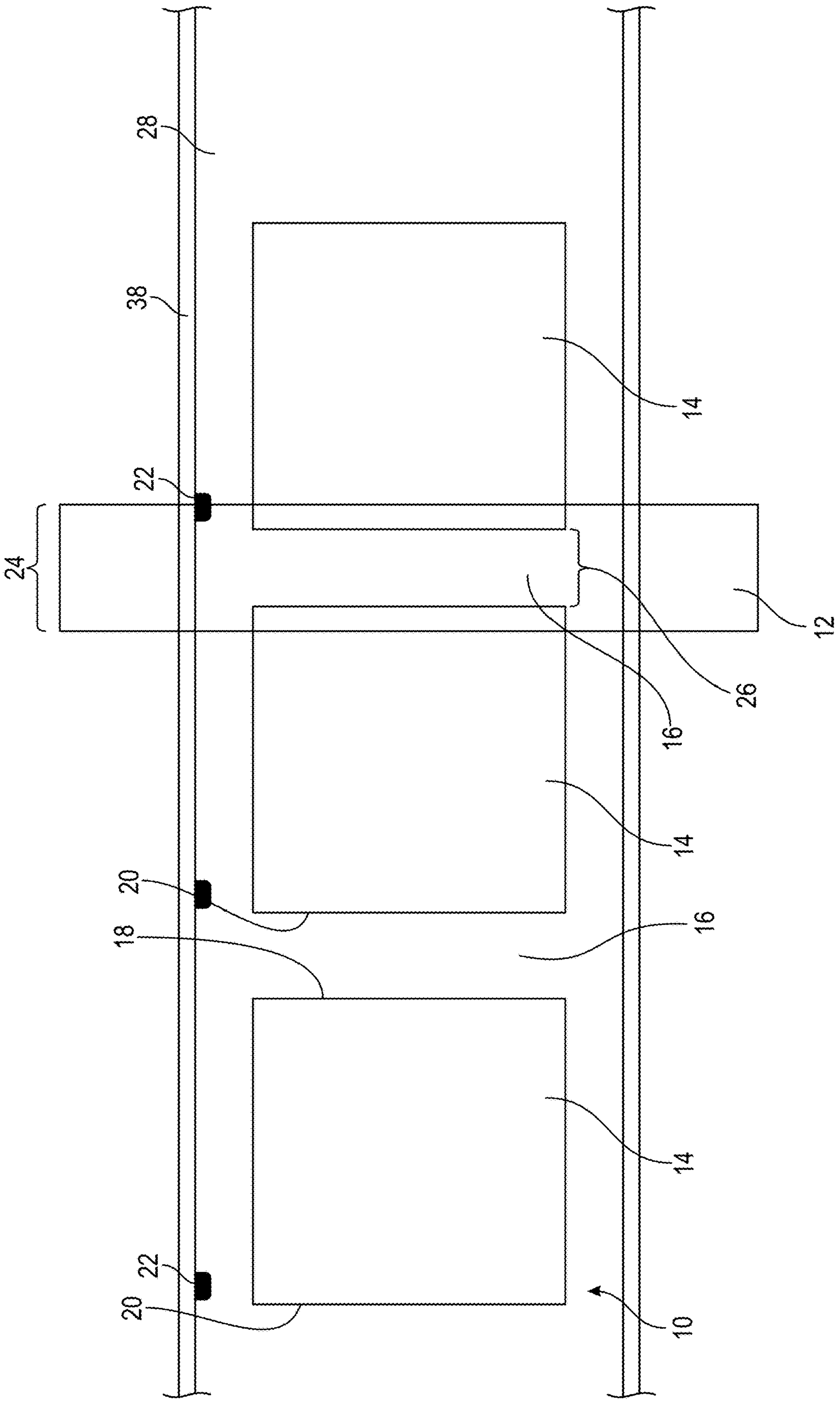
FIG. 1 is a schematic that provides a top-down view of a continuous media comprised of a plurality of pages in a media path of a printer.

Referring now to FIG. 1, a continuous media 10 useful in the printer and method of the present invention is shown in relation to a printhead 12 of a printer of the present invention. The continuous media 10 is formed of a plurality of sequential pages 14 separated by a space 16. In one embodiment, the pages 14 correspond to labels. For instance, the continuous media 10 includes a plurality of detachable labels 14 mounted on a continuous backing 28. Each page 14 of the continuous media 10 has a top 18 and a bottom 20, where the bottom 20 of a page 14 is positioned adjacent to the top 18 of an adjacent page separated by a space 16. The continuous media 10 has a plurality of top of form marks 22 each indicating the position of the top 18 of a corresponding page 14 on the continuous media. In one embodiment, each top of form mark 22 is located on a page 14 on the continuous media 10. In another embodiment, each top of form mark 22 is located on the continuous media 10 apart from its corresponding page 14 (not shown). The top of form mark may be any mark applied to the continuous media or any mark produced by cuts in the continuous media including die-cuts, printed marks, gaps, holes, or other characteristics that may be applied in a regular manner to the continuous media to indicate the top 18 of a page 14 or label. As described with reference to FIGS. 2 and 3, the printer and the method of the present invention are effective to fully print an image on the plurality of pages 14 without printing on the spaces 16 of the continuous media 10 even though the printhead 12 of the printer has a width 24 that is wider than the width 26 of the space 16 as the continuous media 10 is moved along a media path 38 through the printer.

The continuous media comprising detachable labels may be label media for use on GHS drums, chemical labels, bottle labels, pharmaceutical labels, packaging labels, food labels, and any type of label that is produced by printing labels in a continuous format including die-cut and web press label printing.

Figure 2:
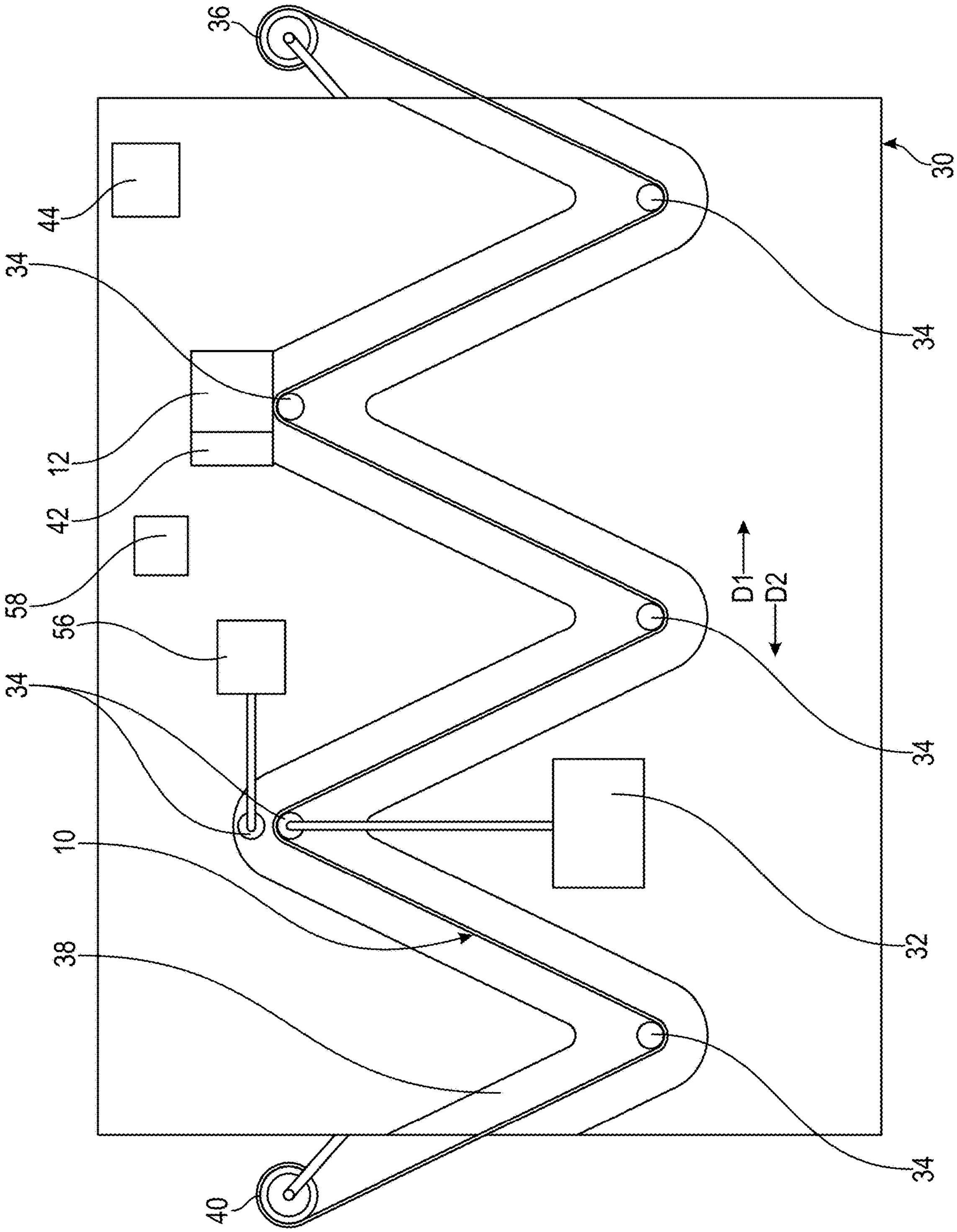
FIG. 2 is a schematic view of a printer of the present invention.

Referring now to FIG. 2, in one aspect the present invention is a printer 30. The printer 30 has an actuator 32 that is structured and arranged to control the movement of the continuous media 10 through the printer 30. In an embodiment, the actuator 32 is a drive mechanism that is coupled to means for directing the movement of the continuous media 10 through the printer along a media path 38. In an embodiment, the means for directing the movement of the continuous media 10 through the printer 30 comprises one or more rollers 34 over which the continuous media 10 may be moved and which provide tension on the continuous media to ensure the continuous media may be fed smoothly through the printer 30. The drive mechanism is coupled to the rollers 34 so the motion produced by the drive mechanism turns the rollers 34 to move the continuous media 10 along the media path 38. In an embodiment, the continuous media 10 may be fed from a feed roll 40 to the rollers 34 and collected after printing on a collector roll 36.

The actuator 32 drive mechanism may be a drive motor. In one embodiment, the actuator 32 is a drive motor structured and arranged to move the continuous media 10 in a first direction D1 through the printer 30 and past the printhead 12 along the media path 38. In another embodiment, the actuator 32 is a reversible drive motor structured and arranged to move the continuous media 10 in the media path 38 in a first direction D1 and in a second direction D2, where the second direction D2 is opposite the first direction D1. In an embodiment, the reversible drive motor is capable of changing the direction of the continuous media in the media path 38 by changing the direction of rotation of the rollers 34, the collector roll 36, and/or the feed roll 40.

The printer further includes a printhead 12 structured and arranged to print on the continuous media 10 as the continuous media is moved in the media path 38 by applying ink onto the continuous media. Referring back to FIG. 1, the printhead 12 has a width 24 as measured substantially parallel or parallel to the media path 38 where the width 24 of the printhead 12 is greater than the smallest distance between the top 18 and the bottom 20 of adjacent pages 14 on the continuous media 10 (shown as width 26 of space 16). The printhead 12 is structured and arranged to apply ink from an ink source onto the continuous media 10. In an embodiment, the printhead 12 has a plurality of rows of a plurality of nozzles through which the ink is passed from the ink source to apply the ink to the continuous media 10.

Referring now to FIGS. 1 and 2, the printer 30 further comprises one or more sensors 42 structured and arranged to detect/configured for detecting top of form marks 22 on the continuous media 10 as the continuous media is moved through the printer along the media path 38. In a preferred embodiment, the sensors 42 are positioned near the printhead 12 along the media path 38 in order to provide a top of form mark 22 signal for a page as the page is about to be printed by the printhead. In an embodiment, the sensor 42 can be a reflective sensor effective to detect top of form marks 22 that are printed on the continuous media 10. In another embodiment, the sensor 42 can be a gap sensor effective to detect top of form marks 22 that are cuts, gaps, or holes in the continuous media 10. In a preferred embodiment, the one or more sensors 42 include both reflective sensors and gap sensors so the sensors may detect top of form marks 22 that are either printed on the continuous media 10 or are cuts, gaps, or holes in the continuous media.

Referring to FIG. 2, the printer 30 comprises a controller 44. The controller 44 is structured and arranged to provide a digital image 46 to the printhead 12 for printing on the continuous media 10. The controller 44 is signally coupled to the one or more sensors 42 and to the printhead 12. The controller 44 may be signally coupled to the sensors 42 wirelessly or by electrical wires. The controller 44 may also be signally coupled to the printhead 12 wirelessly or by electrical wires.

Figure 3:
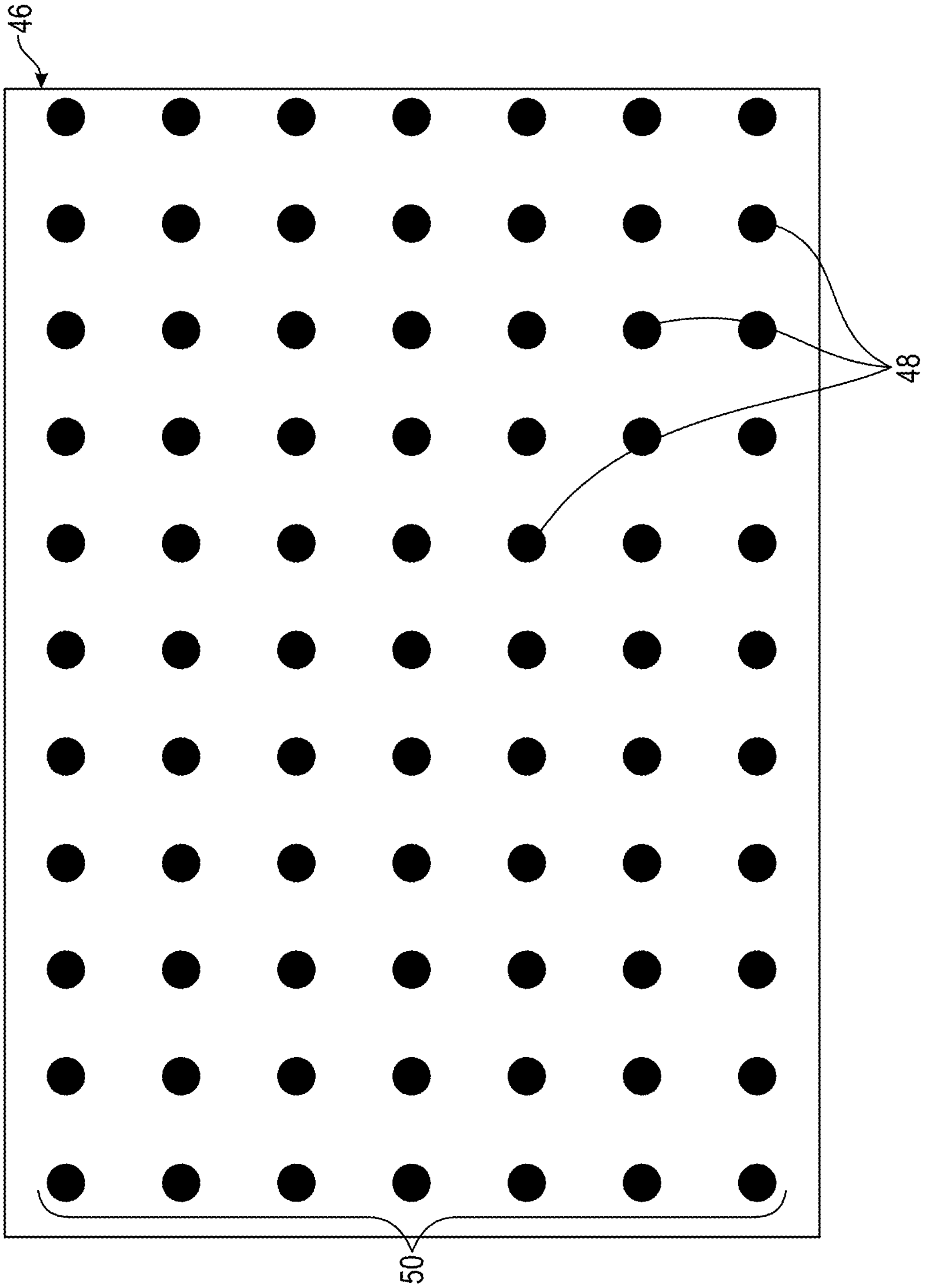
FIG. 3 is a schematic view of a digital image.

The controller 44 is structured and arranged to receive an image. As shown in FIG. 3, the image may be a digital image 46 comprised of pixels 48 arranged in a plurality of rows 50. In an embodiment, the controller 44 is structured and arranged to receive and store metadata directed to the digital image 46. Such metadata may include the size of the digital image 46, the number of pixels 48 in the digital image, and the number of rows of pixels 50 in the digital image. The controller may be structured and arranged to determine data about the digital image such as the size of the image, the number of pixels in the image, and the number of rows of pixels in the digital image.

The controller 44 is structured and arranged to receive a digital image from a digital image source 58 (as shown in FIG. 2). In one or more embodiments, the digital image source may be the Internet. In other embodiments, the digital image source 58 may be a memory device on which the digital image is stored. In yet other embodiments, the digital image may be obtained from multiple sources, such as, the Internet, a memory device, etc. In one embodiment, the controller 44 may comprise means for wirelessly receiving and/or receiving over a wired connection a digital image 46 from a modem, router or from any device effective to transmit a digital image. In another embodiment, the controller 44 may comprise a port for receiving the digital image from a digital memory device.

Referring to FIGS. 2 and 3, the controller 44 may be structured and arranged to store the received image 46. The controller 44 may comprise digital memory in which the digital image 46 may be stored.

Referring again to FIGS. 1 and 2, the controller 44 is structured and arranged to receive a signal from a sensor 42 indicating the sensor has detected a top of form mark 22 of a page 14 on the continuous media 10. As noted above, the controller 44 is signally coupled to the sensor 42, and the sensor is structured and arranged to detect a top of form mark 22 of a page 14 as the continuous media 10 is moved through the printer 30 along the media path 38. The controller 44 and the sensor 42 are signally coupled so the controller 44 receives a signal from the sensor upon the sensor detecting a top of form mark 22 of a page 14.

Referring now to FIGS. 2 and 3, the controller 44 provides a signal to the printhead 12 including one or more rows or pixels 50 of the digital image 46 but not the entire image and sequentially provides more rows 50 of the image to the printhead as the image is printed on the continuous media until the entire image is printed on a page 14 of the continuous media 10. In another embodiment, the controller 44 provides the entire digital image at once to the printhead.

In one embodiment, the controller 44 is structured and arranged to control the printer 30 to print the image 46 on the continuous media 10 in a roll-to-roll/banner mode. In a roll-to-roll/banner mode the controller 44 controls the printer 30 so the printer prints an image 46 provided to the controller 44 on a plurality of consecutive pages of the continuous media 10 while continuously moving the continuous media through the printer 30 in one direction in the media path 38. Roll-to-roll mode printing is particularly useful for printing at high speed with no start-stop issues. The controller 44 in conjunction with the sensor 42 and the printhead 12 enables printing on a continuous media having pages or labels separated by spaces having a width less than the width of the printhead in a roll-to-roll/banner mode.

Referring now to FIGS. 1-3, in the roll-to-roll/banner mode the controller 44 is structured and arranged to determine an amount of a digital image 46 remaining to be printed on a page 14 of the continuous media 10 on which the printhead 12 is printing the digital image upon receiving a top of form mark 22 signal from the sensor 42 indicating the top 18 of an unprinted page on the continuous media 10 that is adjacent to the page on which the printhead is printing the digital image. In an embodiment of the invention, the controller determines the amount of the digital image 46 remaining to be printed on the page 14 on which the printhead is printing the digital image by determining the number of rows of pixels 50 of the digital image that have not been printed. In another embodiment, the controller 44 may determine the amount of the digital image 46 remaining to be printed on the page 14 on which the printhead 12 is printing the digital image by determining the number of rows of pixels 50 of the digital image that have not been printed relative to the total number of rows of pixels of the digital image.

In the roll-to-roll/banner mode, the controller 44 is structured and arranged to determine the position on the page 14 on which the digital image 46 is being printed to stop printing on said page based on the controller's determination of the amount of the digital image remaining to be printed on the page. In an embodiment, the controller 44 may calculate the position to stop printing on the page 14 from the amount of the digital image remaining to be printed based on metadata regarding the digital image, for example, the size of the pixels 48 and the spacing between the rows of pixels 50. Alternatively, the controller 44 may calculate the position to stop printing on the page 14 from properties of the digital image 46 determined by the controller.

In the roll-to-roll/banner mode, the controller 44 is structured and arranged to provide a signal to the printhead 12 to direct the printhead to stop printing the digital image 46 on the page 14 on which the digital image is being printed based on the controller's determination of the position to stop printing on said page. As noted above, the controller 44 is signally coupled to the printhead 12 so the controller 44 may provide a signal to the printhead to stop printing on the page 14. Upon receiving the signal to stop printing from the controller 44, the printhead 12 or a portion thereof is structured and arranged to stop applying ink to the continuous media 10.

The controller 44 and the printhead 12 may be signally coupled so the controller 44 may provide a signal to only a portion of printhead to stop printing. The controller 44 may provide a signal to a trailing portion of the printhead (relative to the direction of the continuous media in the media path) to stop printing while the leading portion of the printhead begins printing on adjacent page 14 on the continuous media.

In the roll-to-roll/banner mode, the controller 44 is structured and arranged to provide a signal to the printhead 12 to direct the printhead to initiate printing of the digital image on a page 14 at the top 18 of the page upon receiving a top of form mark 22 signal from the sensor 42. The controller 44 may direct a portion of the printhead 12 initiate printing on a page 14 at the top 18 of the page while the controller has directed another portion of the printhead to print the image on an adjacent page and the controller has directed another portion of the printhead to stop printing on the continuous media 10.

In another embodiment, the controller 44 is structured and arranged to control the printer to print the image 46 on the continuous media 10 in a page placement mode. In the page placement mode, the controller directs the actuator 32 to control the movement of the continuous media 10 in the media path 38 such that after printing on a page 14 is completed, the movement of the continuous media in the media path 38 is reversed and the continuous media is backed up a to the top 18 of an unprinted page adjacent to the page on which printing has just completed, where the top of the unprinted page is indicated by a top of form mark 22 of that page. The controller 44 then directs the actuator to reverse the movement of the continuous media 10 in the media path 38 again and directs the printhead 12 to print the image 46 on the unprinted page.

Referring to FIGS. 1 and 2, in the page placement mode the controller 44 is structured and arranged to provide a signal to the printhead 12 directing the printhead to print the digital image on a page 14 of the continuous media starting the top 18 of the page at a position indicated by the top of form mark 22. In an embodiment, the controller 44 is structured and arranged to provide the signal to the printhead 12 to print the image on a page upon receiving a top of form mark signal from the sensor 42. In another embodiment, described more fully below, the controller 44 is structured and arranged to provide the signal to the printhead to print the image on a page on receiving a signal from an encoder 56 that the printhead is at the top of the page.

In the page placement mode, the controller 44 can provide a signal to the actuator 32 to move the continuous media 10 in the first direction D1 upon providing a signal to the printhead 12 directing the printhead to print the digital image on a page 14 of the continuous media starting at a position indicated by the top of form mark 22. The actuator 32 moves the continuous media 10 in the first direction while the image is printed on the page 14. The controller 44 can further provide a signal to the actuator 32 to move the continuous media 10 in the second direction D2 opposite the first direction D1 upon completing printing the image on the page 14 and to stop moving the continuous media 10 in the second direction D2 upon the continuous media being positioned at a position indicated by a page top of form mark 22 of an unprinted page adjacent the page on which the image has been printed.

In one embodiment of the page placement mode, the controller 44 is structured and arranged to provide a signal to the actuator 32 to stop moving the continuous media 10 in the second direction D2 upon receiving a signal from sensor 42 indicating detection of the page top of form mark 22 of the unprinted page adjacent the page on which the image has been printed. In another embodiment, the printer comprises an encoder 56 signally coupled to the controller 44 and to the sensor 42. The encoder 56 is structured and arranged to measure a distance the continuous media 10 has travelled in the media path 38 in the first direction D1 past the position of the page top of form mark 22 of the unprinted page and, upon reversing direction of the continuous media in the second direction D2, to measure the distance the continuous media has travelled in the second direction. The encoder 56 is signally coupled to the sensor 42 to receive a signal indicating the sensor's detection of the page top of form mark 22 of the unprinted page as the image is being printed on the adjacent printed page and the continuous media is moved in the first direction D1. The encoder 56 is signally coupled to the controller 44 to provide a signal to the controller 44 of the distance the continuous media travelled in the first direction D1 after receiving a page top of form mark 22 signal for the unprinted adjacent page and to provide a signal to the controller of the distance the continuous media has travelled in the second direction D2 after the actuator moves the continuous media in the second direction D2. The controller is structured and arranged/configured to provide a signal to the actuator 32 to stop moving the continuous media 10 in the second direction D2 when the encoder 56 measured distance of movement of the continuous media in the second direction is equal to the encoder 56 measured distance of movement in the first direction D1.

In the page placement mode, the controller 44 is structured and arranged to provide a signal to the printhead 12 directing the printhead to print the digital image on the adjacent unprinted page starting at the top 18 of the adjacent page as indicated by the page top of form mark 22 after the controller has provided a signal to the actuator 32 to stop moving the continuous media in the second direction. The controller 44 is structured and arranged to provide a signal to the actuator 32 to move the continuous media 10 in the first direction D1 upon providing a signal to the printhead 12 directing the printhead to print the image on the adjacent page. The controller 44 is further structured and arranged to provide a signal to the printhead 12 to direct the printhead to stop printing the image upon completion of the printing of the image on the page.

In a preferred embodiment, the controller 44 is comprised of a software module. The software module comprises one or more software program modules for performing functions of the controller 44. The program modules may include routines, programs, objects, components, logic, and data structures that perform particular controller 44 tasks or implement particular abstract data types. The program modules may include program routines that are designed to receive signals from the actuator 32, the one or more sensors 42, and the encoder and to provide signals to and to control the actuator and the printhead 12.

In an embodiment of the present invention, the controller 44 is comprised of a digital memory storage device. The digital storage memory device may be utilized to store a digital image, to store signal information from the one or more sensors 42, and to store measured distance information from the encoder.

In another aspect of the invention, the invention is a process for printing an image on a continuous media in a roll-to-roll/banner mode. In the process, a digital image is provided to a printer. The digital image has a total height as measured from the top of the image to the bottom of the image. The digital image may be comprised of a plurality of pixels arranged in a plurality of rows. The height of the digital image may be determined by the number of rows of pixels.

A continuous media is fed through the printer along a media path extending through the printer. The continuous media is comprised of a plurality of pages that are positioned sequentially on the media, where each page has a top and a bottom and the bottom of one page is positioned adjacent to the top of an adjacent page on the continuous media. The continuous media has a plurality of top of form marks where the continuous media includes a top of form mark for each page where the top of form mark indicates the position of the top of its corresponding page. In one embodiment, the top of form marks are located on the continuous media but not on the pages of the continuous media. In another embodiment, the top of form marks are located on the continuous media on a corresponding page. In one embodiment, the continuous media is comprised of a continuous backing and a plurality of sequentially arranged detachable labels mounted on the continuous backing, where each page is a label on the continuous media.

The digital image is printed onto the continuous media on a first page of the plurality of pages of the continuous media by applying ink onto the first page through a printhead of the printer that is located along the media path. The printhead may apply the ink through a plurality of ink nozzles, where the nozzles of the printhead may be arranged in a plurality of rows. The digital image may be printed on the continuous media by printing one or more rows of pixels of the image at a time through the rows of nozzles of the printhead.

While the digital image is being printed onto the first page of the continuous media, the top of form mark corresponding to a second page of the plurality of pages of the continuous media is detected, where the second page is adjacent to the first page on the continuous media. The top of form mark of the second page may be detected with a sensor for detecting such top of form marks. The top of form mark may be printed on the continuous media or may be a die cut, gap, or hole in the continuous media.

After printing the digital image onto the first page, application of ink to the continuous media is stopped to introduce a space between printing on the first page and printing on the second page, where the position on the continuous media at which application of ink to the continuous media is to be stopped is based on a determination that is based on the detection of the top of form mark of the second page. Determination of the position to stop applying ink on the continuous media is made by determining the amount of the digital image yet to be printed on the first page upon detection of the top of form mark of the second page. The amount of the digital image yet to be printed on the first page upon detection of the top of form mark of the second page may be determined by determining the number of rows of pixels of the digital image remaining to be printed on the first page when the top of form mark of the second page is detected. The remaining rows of pixels are printed on the first page and then application of ink is stopped.

The digital image is then printed onto the continuous media on the second page of the plurality of pages of the continuous media by applying ink through the printhead onto the second page. The position on the continuous media for initiation of printing the digital image on the second page is based on the top of form mark corresponding to the second page. The width of the space produced by stopping application of ink to the continuous media after printing the digital image on the first page and initiating printing the digital image onto the continuous media on the second page, as measured in the direction of movement of the continuous media in the media path is smaller than the width of the printhead where the width of the printhead is measured in the direction of the movement of the continuous media in the media path.

The process may be continued to print the digital image on each page of the continuous media. For example, the top of form mark of a third page adjacent to the second page may be detected while the digital image is being printed on the second page, a determination may be made of when to stop application of ink on the second page based on the detected top of form mark of the third page, and initiation of printing the digital image on the third page may be effected at the top of the third page based on the top of form mark position of the third page on the continuous media, and so on until all the pages on the continuous media have been printed with the image.

In an embodiment, a controller is used to implement several steps of the process. The controller may be comprised of digital memory and a software module comprised of programs, routines, objects, components, and data structures used to implement steps of the process. The controller may be used to receive and store the digital image in the printer. The controller may be used to direct the printhead to apply ink to the pages of the continuous media. The controller may be used to calculate the position on a page to stop application of ink and may be used to direct the printhead to stop applying ink to the continuous media based on such calculation.

In an embodiment, one or more sensors are used to detect top of form marks on the continuous media. The one or more sensors may provide a signal indicating detection of a top of form mark to a controller.

In an embodiment, an actuator is used to move the continuous media in a media path through the printer. The actuator may be a drive mechanism such as a drive motor.

In another aspect, the present invention is a process for printing an image a plurality of times on a continuous media in a page placement mode. In the process a continuous media comprised of a plurality of pages that are positioned sequentially on the continuous media is provided. Each page has a top and a bottom and the bottom of one page is positioned adjacent to the top of an adjacent page on the continuous media. The continuous media has a plurality of top of form marks where the continuous media includes a top of form mark for each page where the top of form mark indicates the position of the top of its corresponding page. In one embodiment, the top of form marks are located on the continuous media but not on the pages of the continuous media. In another embodiment, the top of form marks are located on the continuous media on a corresponding page. In one embodiment, the continuous media is comprised of a continuous backing and a plurality of sequentially arranged detachable labels mounted on the continuous backing, where each page is a label on the continuous media.

In the process, a digital image is provided to a printer. The digital image may be comprised of a plurality of pixels arranged in a plurality of rows.

The continuous media is fed in a first direction along a media path through the printer, where the printer has a printhead that has a width that is measured in a direction parallel to the first direction. The digital image is printed on a first page of the continuous media as it is fed through the printer in the first direction along a media path. A top of form mark is detected for a second page on the continuous media as the image is printed on the first page, where the second page is located adjacent the first page on the continuous media in a second direction where the second direction is opposite the first direction. The distance between the bottom of the first page and the top of the second page on the continuous media is less than the width of the printhead.

The continuous media is fed through the printer along the media path in the second direction after printing the image on the first page to position the continuous media within the printer at the top of the second page as indicated by the top of form mark for the second page. The continuous media may be positioned within the printer at the top of the second page by backing the continuous media up in the second direction until the top of form mark for the second page is detected or by measuring the distance required to move the continuous media in the second direction with an encoder.

The image is then printed on the second page after positioning the continuous media at the top of the second page while feeding the continuous media along the media path in the first direction.

The process may be continued to print the digital image on each page of the continuous media. For example, the top of form of a third page adjacent to the second page may be detected while the digital image is being printed on the second page as the continuous media is moved in the first direction, the continuous media may be moved in the second direction to position the continuous media at the top of the third page based on the top of form mark of the third page, and the digital image may then be printed on the third page while moving the continuous media in the first direction, and so on until all the pages on the continuous media have been printed with the image.

In an embodiment, a controller is used to implement several steps of the process. The controller may be comprised of digital memory and a software module comprised of programs, routines, objects, components, and data structures used to implement steps of the process. The controller may be used to receive and store the digital image in the printer. The controller may be used to direct the printhead to apply ink to the pages of the continuous media and the controller may be used to direct the actuator to control the movement of the continuous media in the first and second directions in the media path.

In an embodiment, one or more sensors are used to detect top of form marks on the continuous media. The one or more sensors may provide a signal indicating detection of a top of form mark to a controller.

In an embodiment, an actuator is used to move the continuous media in a media path through the printer in the first and second directions. The actuator may be a drive mechanism such as a drive motor.

In yet another embodiment, the top of form marks are virtual and are not explicitly indicated on the pages of the continuous media. Virtual top of form marks do not require sensors for detection. The actuator/drive mechanism can be used to move the continuous media forward or backwards. When using virtual top of form marks, the encoder can be used to measure the distance traveled by the continuous media in both the forward and backward directions. As described earlier, the encoder can be configured to communicate the measurements to the controller. This method can create a continuous image by merging label pages, for instance, into a single print in the format that is expected by the printer's roll-to-roll mode such that the spacing between the labels is less than 10 mm. The printed labels can be correctly printed on the continuous media, as if each label were individually printed.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification be considered as exemplary only.

The term and phrases "invention," "present invention," "instant invention," and similar terms and phrases as used herein are non-limiting and are not intended to limit the present subject matter to any single embodiment, but rather encompass all possible embodiments as described.

The apparatus and methods/processes described herein can "comprise," "consist essentially of," or "consist of" any of the components or steps disclosed throughout the specification. As used in this specification, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and can include the steps/elements of the present invention and do not exclude other steps or elements described herein. The use of the word "a" or "an" when used in conjunction with the term "comprising" in the specification may mean "one," but it is also consistent with the meaning of "one or more," "at least one," and "one or more than one." As used herein, "consisting essentially of" means that the invention may include steps or elements in addition to those recited in the specification, but only if the additional steps or elements do not materially alter the basic and novel characteristics of the present invention.

The invention claimed is:

1. A process, comprising:

providing a digital image to a printer;

feeding a continuous media through the printer along a media path, wherein the continuous media is comprised of a plurality of pages that are positioned sequentially on the continuous media, wherein the continuous media has a top of form mark for each page of the plurality of pages that indicates the position of the top of a corresponding page on the continuous media;

printing the digital image onto the continuous media on a first page of the plurality of pages of the continuous media by applying ink onto the first page through a printhead of the printer located along the media path;

while printing the digital image onto the first page, detecting the top of form mark corresponding to a second page of the plurality of pages of the continuous media, wherein the second page is adjacent to the first page on the continuous media;

stopping application of ink to the continuous media after printing the digital image onto the first page to introduce a space between printing on the first page and printing on the second page, wherein the position on the continuous media at which application of ink to the continuous media is to be stopped is based on a determination that is based upon detection of the top of form mark of the second page; and printing the digital image onto the continuous media on the second page of the plurality of pages of the continuous media by applying ink through the printhead onto the second page, wherein the position on the continuous media for initiation of printing the digital image on the second page is based on the top of form mark corresponding to the second page, and wherein the width of the space produced by stopping application of ink to the continuous media after printing the digital image on the first page and initiating printing the digital image onto the continuous media on the second page, as measured in the direction of the movement of the continuous media in the media path, is smaller than the width of the printhead where the width of the printhead is measured in the direction of the movement of the continuous media in the media path.

2. The process of claim 1, wherein:

the determination of the position on the continuous media at which application of ink to the first page of the continuous media is to be stopped is based on the amount of the digital image yet to be printed on the first page upon detection of the top of form mark of the second page; and the position on the continuous media for initiation of printing the digital image on the second page is located aligned with the top of form mark for the second page.

3. The process of claim 1, wherein:

the digital image is provided to the printer by providing the digital image to a controller comprising a program module;

a signal is provided to the controller upon detection of the top of form mark for the second page; and the controller is utilized to determine the position on the continuous media at which the application of ink to the continuous media is to be stopped after receiving the top of form mark signal for the second page.

4. The process of claim 1, wherein the second page is located adjacent the first page on the continuous media opposite the direction of movement of the continuous media through the media path of the printer.

5. The process of claim 1, wherein each page is a label and the continuous media is comprised of a plurality of detachable labels mounted sequentially on a continuous backing.

* * * * *